United States Patent [19]

Charrat

[11] Patent Number: 5,774,459

[45] Date of Patent: Jun. 30, 1998

[54] METHOD OF MANAGING THE TRANSMISSION OF MESSAGES FROM A SET OF TRANSMITTERS TO A SINGLE RECEIVER ON A SINGLE CHANNEL

[75] Inventor: Bruno Charrat, Aubagne, France

[73] Assignee: Gemplus Card International, Gemenos, France

[21] Appl. No.: 553,356

[22] PCT Filed: May 11, 1994

[86] PCT No.: PCT/FR94/00569

§ 371 Date: Nov. 13, 1995

§ 102(e) Date: Nov. 13, 1995

[87] PCT Pub. No.: WO94/27253

PCT Pub. Date: Nov. 24, 1994

[30] Foreign Application Priority Data

May 12, 1993 [FR] France .................................. 93/05723

[51] Int. Cl.[6] .................................................. H04B 7/00
[52] U.S. Cl. .......................... 370/310; 370/447; 370/462; 455/528
[58] Field of Search ................................. 370/95.1, 95.3, 370/240, 246, 288, 294, 445, 447, 449, 450, 459, 461, 462; 379/28, 59, 63; 455/54.1, 56.1, 507, 509; 371/30, 31, 32; 375/211, 213, 219, 220

[56] References Cited

U.S. PATENT DOCUMENTS

| 3,938,156 | 2/1976 | Lunden ................................... 455/528 |
| 4,337,465 | 6/1982 | Spracklen et al. ...................... 370/447 |
| 4,901,348 | 2/1990 | Nichols et al. .......................... 455/528 |
| 5,086,507 | 2/1992 | Mela ........................................ 455/528 |
| 5,105,423 | 4/1992 | Tanaka et al. ............................. 371/32 |
| 5,122,794 | 6/1992 | Warrior .................................... 370/453 |
| 5,142,533 | 8/1992 | Crisler et al. ............................ 370/348 |
| 5,166,929 | 11/1992 | Lo ........................................... 370/450 |
| 5,319,641 | 6/1994 | Fridrich et al. .......................... 370/447 |
| 5,355,375 | 10/1994 | Christensen .............................. 370/447 |
| 5,481,541 | 1/1996 | Gareh et al. .............................. 370/462 |

FOREIGN PATENT DOCUMENTS

| A-0405695 | 1/1991 | European Pat. Off. . |
| A-2259387 | 3/1993 | United Kingdom . |

Primary Examiner—Benedict V. Safourek
Assistant Examiner—Seema S. Rao
Attorney, Agent, or Firm—Nilles & Nilles SC

[57] ABSTRACT

Methods that enable the simple management of the unilateral exchanges of messages between a highly simplified set of transmitters and a single receiver, this transmission being done on a single channel.

It consists in providing for the transmission, by the receiver (100), of the simplest possible binary signal indicating that the channel is busy as soon as a message from one of the transmitters is detected. Reception of said signal by the other transmitters (102–104) prevents them from transmitting. Risks of collision between messages from different transmitters are handled by a set of test (Tt) and standby (Tv, Ta, Tl) periods. The busy signal may be a simple modulated carrier in the case, for example, of microwave transmission.

It provides for the efficient management of badge-based systems such as access control systems.

19 Claims, 2 Drawing Sheets

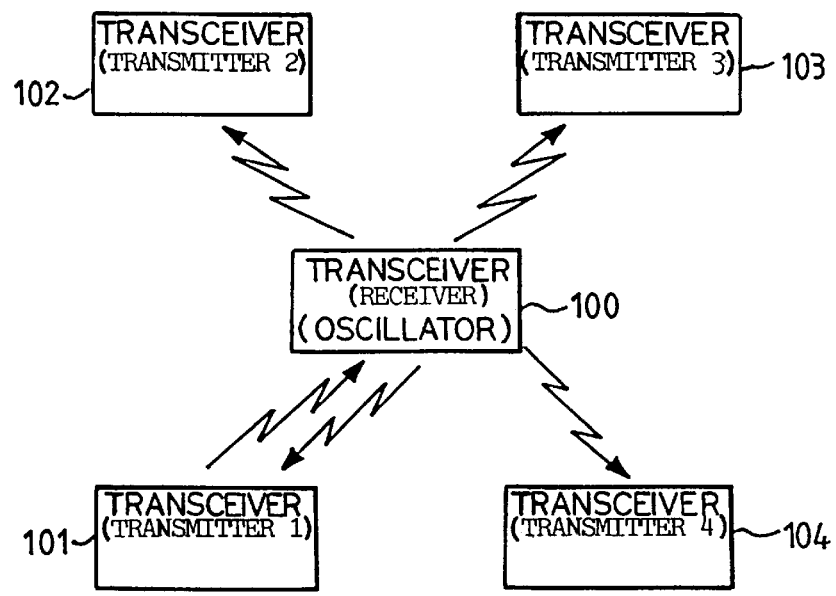
FIG_1
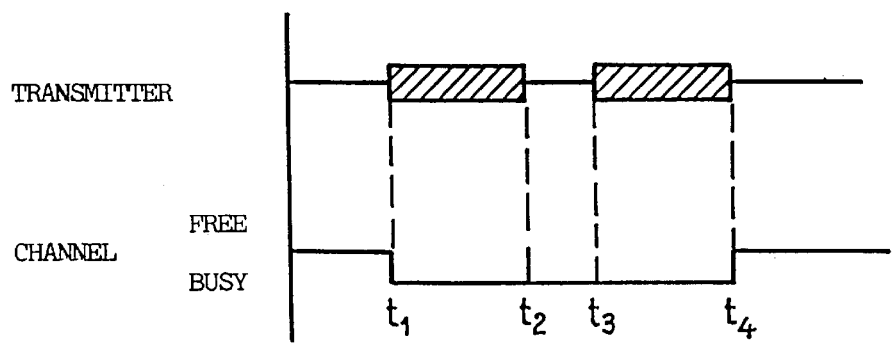
FIG_2
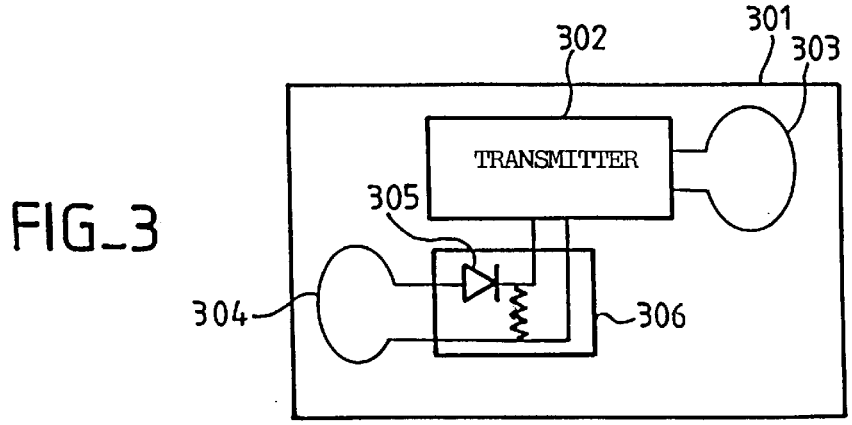
FIG_3

FIG_4
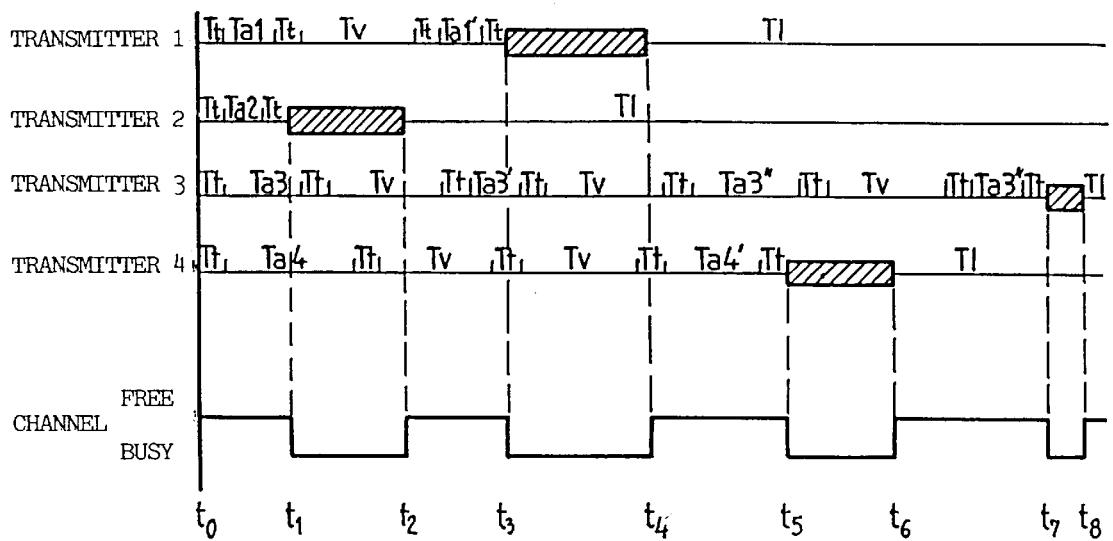
FIG_5
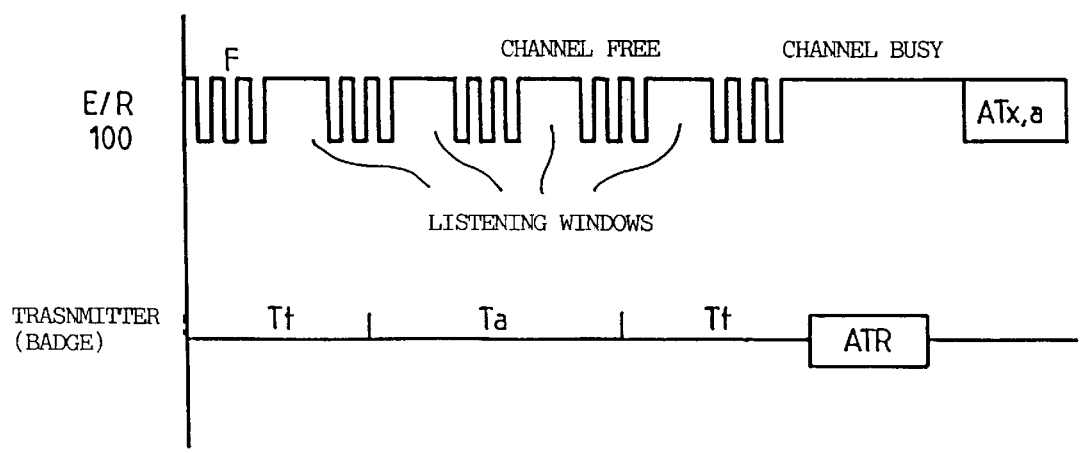

METHOD OF MANAGING THE TRANSMISSION OF MESSAGES FROM A SET OF TRANSMITTERS TO A SINGLE RECEIVER ON A SINGLE CHANNEL

BACKGROUND OF THE INVENTION

The present invention relates to methods that enable the management of the transmission of messages coming from a set of transmitters to a single receiver that is common to them, when the transmission channel is formed by a single channel through which all these messages have to travel.

In a system of transmission comprising several transmitters and a single receiver connected together by a single channel, it is essential to manage the transmission of the messages so as not to bring about any confusion between them. In a radiotelephony network for example, an essentially oral procedure is used, relying basically on the operators' intelligence. In a data transmission system that generally works automatically, a more set procedure is used, applied by logic devices located both in the transmitters and in the receiver. These methods are known, for example, by the names of ALOHA, CSMA, CSMA/CD, etc.

Most of these methods use a system for the dispatch of acknowledgment messages carried out by the transmission of data elements from the single main receiver to the transmitters. These transmitters therefore must comprise a data reception system that necessarily has a certain degree of complexity.

This is also the case in CSMA type anti-collision methods where the transmission channel is listened to in order to detect a possible collision or else an indication of collision is sent from the receiver when such a collision has taken place. Here too, the receivers must have a data reception system of non-negligible complexity.

Systems are currently being developed, comprising transmitters connected to a single receiver by a single channel. For example, reference may be made to microwave badges which are designed for many uses, for example checking access and highway tollgate payment. It is being attempted to make these badges in the form of a card, preferably having the size and weight of a credit card, possibly integrating a cell that must last several years. It can easily be seen that, in this case, the addition of a data receiver and the complexity of the management of transmission could be prohibitive in every respect.

Since, furthermore, these cards necessarily work at only one frequency as they have to be made in several copies and have to capable of functioning in a large number of distinct places spread out over a territory, it is absolutely imperative to manage the collision of the messages that they transmit almost simultaneously towards one and the same receiver. It is important that the data reception system as well as the management procedures should be extremely simplified, for these transmitters must be small and must cost little.

This problem has not been resolved satisfactorily up till now.

OBJECTS AND SUMMARY OF THE INVENTION

To resolve this problem, the invention proposes a method for managing the transmission of the messages from a set of transmitters to a single receiver on a single channel, chiefly characterized in that as soon as the receiver receives the transmission from one of the transmitters, it sends all the receivers, at least throughout the period of transmission by the active transmitter, a binary information element indicating that the channel is busy, and in that the reception of this binary information element inhibits any attempted transmission by the other transmitters.

BRIEF DESCRIPTION OF THE DRAWINGS

Other particular features and advantages of the invention shall appear more clearly in the following description, given by way of a non-restricted example with reference to the appended figures of which:

FIG. 1 shows a drawing of a set of transmitters connected to a single receiver;

FIG. 2 shows a first timing diagram;

FIG. 3 shows a simplified drawing of a transmitter; and

FIG. 4 shows a second timing diagram;

FIG. 5 shows a timing diagram in the case of a full-duplex transmission.

DESCRIPTION OF THE PREFERRED EMBODIMENT

In the following description, to simplify matters, the term "receiver" shall be used for the unit responsible for receiving data elements transmitted by a set of transmitters working on a single frequency, it being understood that all these elements are transceivers. A system such as this has been shown schematically in FIG. 1. Thus, the receiver 100 is capable of receiving data elements from a set of transmitters, and four transmitters 101 to 104 are shown in this figure.

According to the invention, when one of the transmitters, 101 for example, starts sending data elements to the receiver 100, the latter makes a return retransmission of an extremely simple busy signal. It may be a non-modulated carrier for example in the case of microwave transmission, and this signal is received by all the transmitters. This busy signal therefore transmits a binary information element. The transmitters 102 to 104, which are not sending data elements to the receiver, interpret this signal as a signal indicating that the channel common to all the transmitters is busy and then refrains, throughout the period when this busy signal is received, from transmitting data elements that it might possibly have to transmit. When the transmitter 101 has finished sending its message, it stops transmission and the receiver then stops sending the busy signal, thus disengaging the channel and thus enabling another of the transmitters to have this channel available to make transmission in turn.

The device for implementing this method may comprise for example, again in the example of microwave transmission, in the receiver, a simple oscillator connected to a transmission antenna and put into operation by the detection of the reception of the signal from the transmitter. Furthermore, the transmitter may for example, as shown in a very simplified way in FIG. 3, be a microwave badge 301 carrying a transmitter 302 connected to a tuned transmission loop 302. This badge then, according to the invention, has a reception loop 304 tuned to the frequency of the busy signal received from the receiver 100. The signal received on this loop is rectified by a diode 305. This delivers a DC voltage applied to the transmitter 302 which, when it is not in a state of transmission, is turned off by this voltage. Non-deactivation when the transmitter is already transmitting may be obtained by a very simple logic system 306 as shown in FIG. 3.

This example, which is simplified to the utmost degree, enables an understanding of the principle of the invention but leaves the resolution of a certain number of problems pending.

The first of these problems consists of the management of the acknowledgments of the messages, namely the informing of the transmitter that the data received in the receiver is accurate so that the transmitter can, if necessary, retransmit this data until it is received accurately, at least within certain time limits.

For this purpose, in a very simplified way, the receiver will analyze the data elements received and verify their validity according to known methods, for example by methods of parity. When these data elements are recognized as being accurate, within the usual limits provided by these systems, the receiver will stop the transmission of the channel busy signal. If, on the contrary, these data elements are not recognized as being accurate, this signal will continue to be transmitted and the transmitter 101 will interpret the absence of stopping of this transmission as the indication of wrong reception and as a request to retransmit the message. The process will then be repeated for a sufficient number of times until the reception is accurate.

However, to prevent the channel from being permanently busy because of a routine error, for example very poor transmission, this retranmsission will be limited to an adequate number of times determined essentially as a function of the number of transmitters likely to be awaiting their turn to make transmission.

This sequencing has been shown symbolically in FIG. 2 where the periods of transmission of the transmitter, represented by shaded rectangles, can be seen on the top line and the free or busy states of the channel, represented by high and low signals, can be seen on the bottom line.

When the transmitter starts sending its message for a first time, the signal goes from the free state to the busy state, corresponding to the transmission of the busy signal at the instant t1. The transmitter ends its first transmission at the instant t2, and in the example shown in the figure, the receiver determines the fact that the received message is incorrect. It therefore continues to send its channel busy signal, thus continuing to block transmission from the other transmitters but informing the operating transmitter that the message has been poorly received. This operating transmitter therefore retransmits its message starting from the instant t3 up to the instant t4. At this instant t4, in this example, the receiver determines the fact that the message is properly received and therefore stops sending the busy signal. The state of the channel then becomes free again. This enables the other transmitters to take over.

It is also desirable to deal with the problem of collisions in transmission when several transmitters seek to start operating simultaneously. In simple systems, this could be dealt with implicitly, firstly by counting on the fact that this situation will be relatively rare because the system does not have many transmitters and, secondly, because if several transmitters start transmitting simultaneously, the reception will be necessarily poor and they will therefore stop transmitting after the prescribed number of retransmissions to avoid jamming.

This approach, however, is not very satisfactory in itself and soon becomes ineffective when the number of transmitters attains a minimally important level.

To resolve this problem, the invention proposes in addition to use a slightly more complicated sequencing system as illustrated for example in FIG. 4.

First of all, each transmitter, before making transmission, tests the busy state of the channel for a period Tt that may be relatively short and have an identical value for each of the transmitters.

There are then two possibilities:
if the channel is busy, the transmitter goes into a state of standby for a fairly lengthy period Tv, which is preferably longer than the maximum period of transmission planned for a message;
if the channel is free, this means that no other transmitter is transmitting but then there is a risk that several transmitters may start transmitting at the same time at the end of the period Tt. To avoid this, the transmitter then goes into a state of standby for a random period Ta and then again tests the state of engagement of the channel for a period Tt and then starts transmitting if the channel is still free at the end of this period.

If, on the contrary, at the end of this period Ta, the channel is engaged by a transmitter that has started transmitting in the meantime, the system is in the first possible situation and the sequence starts again. The distribution of random elements in the period Ta, both between the transmitters and between the successive periods of one and the same transmitter, is such that the risk of having two simultaneous transmissions start on two different transmitters is almost zero.

In the very rare cases where this happens, there would be a reception error and an exit would be made from the state of collision after the prescribed number of repetitions, as in the case of the system not protected against collisions as explained further above.

Referring to FIG. 4, it can be seen that by assuming that, at the instant t0, the four transmitters are seeking to make transmission, all four of them test the channel for the period Tt and then go into standby for the periods Ta1, Ta2, Ta3 and Ta4. Since Ta2 is the shortest period, when the transmitter 2 again tests the state of the channel during the period Tt, it finds it free and then starts making transmission at the instant t1: this is represented by the shaded rectangle.

Depending on the lengths of the other random standby periods, at the instant t1 the transmitter 1 is in a duration Tt for testing the channel and the transmitters 3 and 4 are still in their random standby periods Ta3 and Ta4.

Assuming, in this example, for simplicity's sake that reception is good, the transmission from the transmitter 2 ends at the time t2 and the channel becomes free again. To then enable a maximum number of the other transmitters to send the messages that they would have to send, the transmitter 2 then goes into a state of standby for a relatively lengthy period Tl to enable, for example, the other three transmitters to have the time to transmit their messages, taking into account also the standby and testing periods.

In this example, at this instant t2, it can be seen in the figure that the system is in the standby period Td of each of the transmitters 1, 3 and 4. At the end of this standby period, these three transmitters go into a test period Tt and the test/random-standby/test sequence starts again for each of them. Given the random standby periods, it is this time the transmitter 1 that first finds the free channel at the instant t3 located at the end of the period Tt that follows the second random period Ta1', while the transmitter 3 for its part is in the random period Ta3' and the transmitter 4 is still in a testing period Tt following a standby period Tv.

The transmitter 1 therefore starts transmitting its message and stops at the time t4 to go into a lengthy period of standby Tl.

At this time, the system is in a standby period Tv for the transmitter 3 and in a testing period Tt following a standby period Tv for the transmitter 4. This test/random-standby/test sequence then takes place for the transmitter 4 and ends before the same sequence, which has started later for the transmitter 3, ends too. It is therefore the transmitter 4 that starts transmitting at the instant t5 up to the instant t6 when it goes into a lengthy period of standby Tl.

At this time, the three transmitters 1, 2 and 4 are in a lengthy period of standby and the transmitter 3 is in a standby period Tv.

It is then the transmitter 3 that starts sending its message at the instant t7 after a sequence Tt-Ta3"-Tt. The latter sequence takes place automatically, even though it is not necessary here, because it is quite possible to have configurations where there is need of it, depending on the random succession of messages and given the fact that the duration Tl has a necessarily finite length.

The message from the transmitter 3 stops at the instant t8, starting from which it goes into a lengthy period of standby Tl. It is then the first of the transmitters that reaches the end of its lengthy standby period and needs to send a new message that starts again in a sequence for testing the channel. In the figure, it is the transmitter 2 that is in this situation.

In order to enable the transmission of a maximum number of messages, it may be useful to see to it that the sum of the periods Tt+Ta+Tt is always smaller than the minimum time taken to transit the message. It will be observed that this condition is not met in the figure so as to make the figure easier to read.

The invention can be applied to any radiofrequency system or to induction coupling systems. The invention can also be applied to a half-duplex transmission. In this case, the transceiver 100 sends out a modulated signal on a carrier. When a transmitter (badge) is in the field of transmission of the transceiver 100, the transmitter (badge) tests the channel during the period Tt to find out if this channel is free or busy.

The channel is free when the activation signal is present (when the carrier is present). The channel is busy when the activation frequency is absent. Listening windows are inserted within the activating frequency (free channel). As soon as the start of a message is received (in the form of an ATR frame), the transceiver 100 declares the channel to be busy (when there is no carrier). Reference could be made to the diagram of FIG. 5 which illustrates this example.

I claim:

1. A method of managing the transmission of messages from first, second and third transmitters to a single receiver on a single channel, the method comprising the steps of:
   receiving, at the receiver, a transmission from the first transmitter,
   sending, from the receiver to the second and third transmitters, a binary information element indicating that the channel is busy, the binary information element being sent when the receiver receives the transmission from the first transmitter and continuing at least throughout the period of transmission by the first transmitter,
   receiving the binary information element at the second and third transmitters, and in response inhibiting any attempted transmission by the second and third transmitters,
   completing the transmission from the first transmitter to the receiver,
   preparing, at the second transmitter, to make a transmission from the second transmitter to the receiver, including the steps of:
      testing the state of engagement of the channel for a first time, and then
         if the first test indicates that the channel is busy, then repeating the first testing step, and
         if the first test indicates that the channel is free, then entering into a state of standby for a random period, and then
      testing the state of engagement of the channel for a second time, and then
         if the second test indicates that the channel is free, then sending the transmission from the second transmitter to the receiver, and
         if the second test indicates that the channel is busy, then entering into a state of standby for a period substantially equal to the average period of transmission of a message from one of the transmitters to the receiver and thereafter returning to the first testing step; and
   wherein the first, second and third transmitters are each approximately the size and weight of a credit card.

2. A method according to claim 1, wherein the receiver continues to transmit the binary information element when the reception of the message transmitted by the first transmitter is wrong, and wherein the first transmitter recommences the same transmission until it is received accurately and within the limit of a predetermined number of times.

3. A method according to claim 1 wherein, when the second transmitter completes its transmission, the second transmitter goes into a standby state for a period long enough to enable several other transmitters to transmit in turn.

4. A method according to claim 1, wherein the binary information element indicating the state of engagement of the channel is a non-modulated carrier.

5. A method according to claim 4, further comprising the step of rectifying the non-modulated carrier to form a DC voltage, the rectifying step being performed at the second transmitter,
   and wherein the second transmitter detects the binary information element, and thereby detects that the channel is busy, by detecting the DC voltage.

6. A method according to claim 1, wherein the first, second and third transmitters are identification badges.

7. A method according to claim 1, further comprising the step of providing each of the first, second and third transmitters with a loop reception antenna coupled to a diode and a resistor, and wherein the binary information element is received in the second and third transmitters by the loop reception antenna.

8. A method of managing the transmission of messages from first, second and third transmitters to a receiver, the method comprising the steps of:
   providing a single channel over which the first, second and third transmitters transmit to the receiver, the channel being formed by a radiofrequency communication channel;
   sending a first message from the first transmitter to the receiver over the channel;
   receiving the first message at the receiver and, in response, transmitting a busy signal from the receiver to the second and third transmitters, the busy signal indicating that the channel is busy and is not available for the second and third transmitters to transmit messages to the receiver, the busy signal continuing at least throughout the period of transmission of the first message by the first transmitter, and the busy signal being transmitted as a binary information element on a dedicated communication channel;
   receiving the busy signal at the second and third transmitters, and in response inhibiting any attempted transmission by the second and third transmitters at least until the first message has been received;

completing the transmission from the first transmitter to the receiver; and preparing, at the second transmitter, to make a transmission from the second transmitter to the receiver, including the steps of testing the state of engagement of the channel for a first time by testing for the presence of the busy signal, and then if the first test indicates that the channel is busy, then repeating the first testing step, and if the first test indicates that the channel is free, then entering into a standby state for a first period, and then testing the state of engagement of the channel for a second time by testing for the presence of the busy signal, and then if the second test indicates that the channel is free, then sending the transmission from the second transmitter to the receiver, and if the second test indicates that the channel is busy, then entering into a standby state for a second period and thereafter returning to the first testing step; and wherein the first, second and third transmitters are each approximately the size and weight of a credit card.

9. A method according to claim 8, wherein the receiver continues to transmit the busy signal when the reception of the message transmitted by the first transmitter is wrong, and wherein the first transmitter recommences the same transmission until it is received accurately and within the limit of a predetermined number of times.

10. A method according to claim 8 wherein, when the second transmitter completes its transmission, the second transmitter goes into a standby state for a period long enough to enable several other transmitters to transmit in turn.

11. A method according to claim 8, wherein the binary information element indicating the state of engagement of the channel is a non-modulated carrier.

12. A method according to claim 11, further comprising the step of rectifying the non-modulated carrier to form a DC voltage, the rectifying step being performed at the second transmitter, and wherein the second transmitter detects the binary information element, and thereby detects that the channel is busy, by detecting the DC voltage.

13. A method according to claim 9, wherein the first, second and third transmitters are identification badges.

14. A method according to claim 8, further comprising the step of providing each of the first, second and third transmitters with a loop reception antenna coupled to a diode and a resistor, and wherein the binary information element is received in the second and third transmitters by the loop reception antenna.

15. A method according to claim 9, wherein the first period is a period of random duration and wherein the second period is substantially equal to the average period of transmission of a message from one of the transmitters to the receiver.

16. A system for transmitting messages from first and second identification badges to a single receiver on a single communication channel, the system comprising:

the receiver, including an oscillator which emits an unmodulated electromagnetic signal when the receiver is receiving a first message from the first identification badge, the unmodulated electromagnetic signal indicating to the second identification badge whether the channel is available, the first identification badge, including a first transmitter which is electromagnetically coupled with the receiver on the channel and which transmits the first message to the receiver, the second identification badge, including a second transmitter which is electromagnetically coupled with the receiver on the channel, the second transmitter having a rectifier which receives the unmodulated electromagnetic signal from the receiver, the unmodulated electromagnetic signal inhibiting the second transmitter from transmitting a second message to the receiver until the first message has been transmitted, and wherein the first and second identification badges substantially always tests the availability of the channel at least twice before attempting to transmit a message.

17. A system according to claim 16, wherein the first and second identification badges are approximately the size and weight of a credit card.

18. A system according to claim 16, wherein each of the first and second identification badges include means for preparing to send a transmission to the receiver, the preparing means including means for testing the availability of the channel for a first time by testing for the presence of the unmodulated electromagnetic signal, and then if the first test indicates that the channel is not available, then repeating the first test, and if the first test indicates that the channel is available, then entering into a state of standby for a period of random duration, and then testing the availability of the channel for a second time by testing for the presence of the unmodulated electromagnetic signal, and then if the second test indicates that the channel is available, then sending the transmission to the receiver, and if the second test indicates that the channel is not available, then entering into a state of standby for a period substantially equal to the average period of transmission of a message from one of the transmitters to the receiver and thereafter returning to the first test.

19. A system for transmitting messages from first and second transmitters to a single receiver on a single communication channel, the system comprising:

the receiver, including an oscillator which emits an unmodulated electromagnetic signal when the receiver is receiving a first message from the first transmitter, the unmodulated electromagnetic signal indicating to the second transmitter whether the channel is available, the first transmitter, which has approximately the size and weight of a credit card, which is electromagnetically coupled with the receiver on the channel, and which transmits the first message to the receiver, and the second transmitter, which has approximately the size and weight of a credit card, which is electromagnetically coupled with the receiver on the channel, and which has a rectifier which receives the unmodulated electromagnetic signal from the receiver, the unmodulated electromagnetic signal inhibiting the second transmitter from transmitting a second message to the receiver until the first message has been transmitted.

* * * * *